May 15, 1928.
S. W. SHAW
1,669,787
HITCH FOR LAWN MOWERS
Filed April 29, 1927
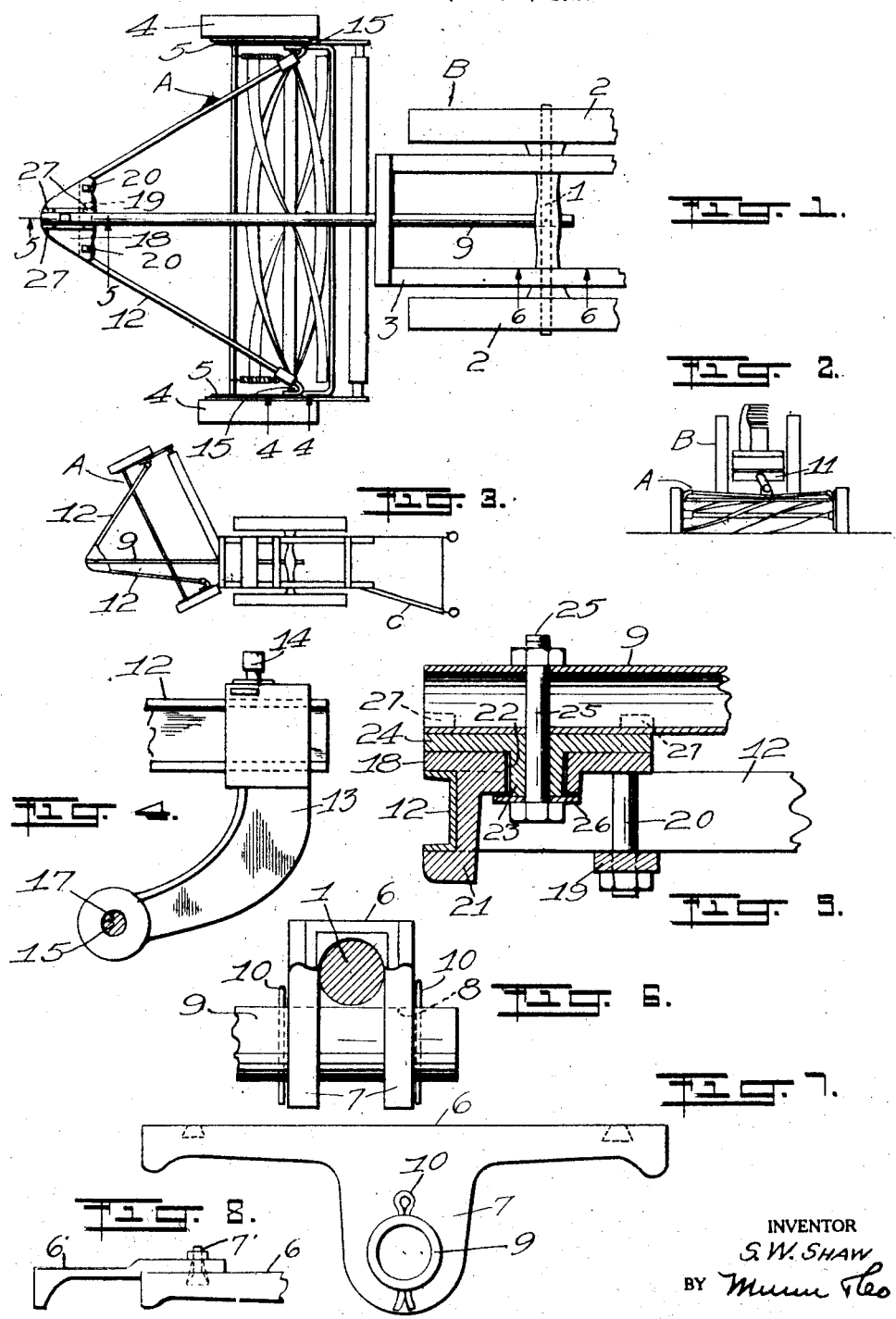
INVENTOR
S. W. SHAW
BY Munn & Co.
ATTORNEYS Patented May 15, 1928.

1,669,787

UNITED STATES PATENT OFFICE.

STANLEY WILBUR SHAW, OF GALESBURG, KANSAS.

HITCH FOR LAWN MOWERS.

Application filed April 29, 1927. Serial No. 187,599.

My invention relates to improvements in hitches for lawn mowers, and it consists in the combinations, constructions, and arrangements herein described and claimed.

An object of my invention is to provide a hitch for attaching a lawn mower in front of a tractor, and in which novel means is employed for easily and quickly attaching the hitch to the tractor.

A further object is to provide a hitch which can be quickly attached to lawn mowers of different widths.

A further object is to provide a hitch in which a maximum of flexibility is attained, thereby permitting the mower and tractor to be turned short, as when turning corners and cutting around trees.

Other objects and advantages will appear in the following specification, and the novel features of the invention will be particularly pointed out in the appended claims.

My invention is illustrated in the accompanying drawings, forming part of this application, in which Figure 1 is a plan view showing a portion of a tractor and lawn mower equipped with my improved hitch, Figure 2 is a diagrammatic front elevation of the device shown in Figure 1, Figure 3 is a diagrammatic top plan view, showing the operation of the hitch when turning a corner, Figure 4 is a sectional view taken along the line 4—4 of Figure 1, Figure 5 is a sectional view taken along the line 5—5 of Figure 1, Figure 6 is a sectional view taken along the line 6—6 of Figure 1, Figure 7 is an end view of the device shown in Figure 6, and Figure 8 is a view showing a modified form of the device shown in Figure 7.

In carrying out my invention I make use of a lawn mower A and a tractor B having handles C, which are secured thereto. In the present instance, the tractor is provided with an axle 1 to which a pair of traction wheels 2 are secured. The wheels 2 and the axle 1 carry the tractor framework 3.

The lawn mower A is provided with a pair of traction wheels 4, each of which carries a frame-supporting member 5. These members carry the rotary blade and other framework of the mower.

A casting 6, having a pair of downwardly extending projections 7, is placed over the axle 1, as shown in Figure 1. Each of the projections 7 is provided with an opening 8 to receive one end of a tubular coupling 9. The tubular coupling 9 when inserted in the openings 8 passes underneath the axle 1, thereby securely locking the casting to the axle. Cotter pins 10 prevent any longitudinal movement of the tubular coupling 9, while at the same time allowing the coupling to rotate within the openings 8. The tubular coupling 9 passes through a bracket 11 on the front end of the tractor frame as shown in Figure 2.

A V-shaped lead bar 12, formed from a piece of channel iron, is pivotally secured at its outer ends to the frame members 5 by means of brackets 13. These brackets are movably secured to each end of the lead bar by means of set screws 14, and are pivotally carried by the frame members 4 by means of lugs 15 passing through openings 17 in the brackets.

The foremost part of the lead bar 12 is securely clamped between a plate 18 and a cleat 19 by means of bolts 20. The plate 18 is provided with an integral lug 21 which bears against the lead bar and passes underneath, as shown in Figure 5. The plate 18 is further provided with an opening 22 arranged to pivotally receive an extension 23 integral with a plate 24. A bolt 25, having a washer 26, is passed through the extension 23, the plate 24, and the tubular coupling 9. Lugs 27, integral with the plate 24, prevent pivotal movement of the plate 24 with respect to the tubular coupling 9.

Referring to Figure 5, it will be seen that the extension 23 is slightly longer than the thickness of the plate 18 so that the plate 24 and the tubular coupling 9 are free to swing in a horizontal plane with respect to the plate 18.

From the foregoing description of the various parts of the device, the operation thereof may be readily understood. The casting 6 is placed on the axle 1, and one end of the tubular coupling 9 is passed through an opening in the bracket 11 and the openings 8 in the projections 7. Cotter pins 10 are then passed through the tubular coupling, thus rotatably connecting the tubular coupling to the tractor B.

Figure 1 shows the normal position of the lawn mower with respect to the tractor when cutting in a straight line. When it is desired to turn short, as when going around a corner, the tractor handles C are pushed to one side, thereby causing the tractor to pivot on its wheels, and at the same time causing the tubular coupling 9 to swing laterally. Since the lead bar 12 is pivotally secured to the tubular coupling 9 by means of the bolt 25, it will be seen that any lateral movement of the coupling 9 will cause the lawn mower to pivot on its wheels. Figure 3 shows the relative position of the lawn mower with respect to the tractor when making a half turn.

It will be observed that since the brackets 13 can be moved along the lead bar 12, the hitch can be readily adjusted to lawn mowers of different widths.

The tubular coupling 9, which is rotatably carried by the bracket 11 and the casting 6, permits the hitch to rotate when the lawn mower or the tractor is moving over uneven ground.

Pushing down on the handles C will cause the tractor to pivot on the axis of its wheels, thus raising the forward end of the tubular coupling 9. Since relatively large surfaces have been provided between the plates 18 and 24, it will be noted that when the forward end of the tubular coupling 9 is lifted the lawn mower will also be lifted. This latter feature permits the lawn mower to be lifted entirely off the ground, as when passing over rocks, etc. the lawn mower can also be lifted off the ground when it has been swung to either side, as when turning. Friction between the tubular coupling 9 which passes through the bracket 11 and the projections 7 is sufficient to prevent rotation of the coupling while the lawn mower is being lifted when it is swung to either side.

When detaching the mower from the tractor, the cotter pins 10 in the tubular coupling 9 are removed, thus permitting the tractor to be pulled away from the lawn mower and the hitch, and further permitting the casting 6 to be removed from the axle. It will thus be seen that I have provided a hitch which requires very little time for attaching or detaching.

In Figure 8, I have shown a modified form of the casting shown in Figure 7. This consists of an extension 6' which can be secured to the casting 6 by means of screws 7', so that the casting may be used on tractors having a wider frame.

I claim:

1. The combination of a tractor, a lawn mower disposed in advance of said tractor, means for propelling the lawn mower by the tractor, said means comprising a coupling secured to said tractor and rotatable about its axis, and means pivotally secured to said coupling and disposed in advance of the lawn mower and being rotatable in a horizontal plane for securing said lawn mower to said coupling.

2. The combination with a tractor having an axle and a lawn mower positioned in front of said tractor, of a lead bar pivotally connected to said lawn mower in advance of the lawn mower, a tubular coupling pivotally connected to said lead bar, and removable means carried by said axle for rotatably carrying one end of said tubular coupling, whereby said lawn mower is yieldingly connected to said tractor.

3. The combination with a tractor having an axle, and a lawn mower positioned in front of said tractor, of a lead bar pivotally connected to said lawn mower to swing in a vertical plane, a tubular coupling pivotally connected to said lead bar in advance of the lawn mower and arranged to swing in a horizontal plane, removable means carried by said axle and arranged to rotatably carry one end of said tubular coupling, and a bracket carried by said tractor for rotatably supporting said tubular coupling, whereby said lawn mower is yieldingly connected to said tractor.

4. The combination with a tractor having an axle, and a lawn mower positioned in front of said tractor, of a lead bar, brackets movably secured to said lead bar and pivotally connected to said mower to swing in a vertical plane, a plate rigidly secured to said lead bar and having an opening, a tubular coupling, a plate rigidly secured to one end of said tubular coupling in advance of the lawn mower and having means arranged to pivotally rotate in the opening in said first-named plate, a bracket carried by said tractor for rotatably supporting said tubular coupling, a casting removably carried by said axle and having means for rotatably supporting said coupling, and means for preventing longitudinal movement of said tubular coupling, whereby said lawn mower is yieldingly connected to said tractor.

5. The combination with a tractor having an axle, and a lawn mower positioned in front of said tractor, of a lead bar, brackets movably secured to said lead bar and pivotally connected to said mower to swing in a vertical plane, a plate having an opening, means for rigidly securing said plate to said lead bar, said plate having a lug adapted to bear against a portion of said lead bar, a tubular coupling, a plate secured to the tubular coupling in advance of the lawn mower and having an extension arranged to enter the opening in said first-named plate, means for pivotally retaining said extension within said opening and for rigidly securing the plate having the extension to said lead bar, a bracket carried by the tractor for rotatably supporting said tubular coupling, a casting removably carried by said axle, and projections integral with said casting and having openings adapted to rotatably receive one end of said tubular coupling, said openings being arranged to permit said tubular coupling to pass underneath the shaft for locking said casting to said axle, whereby said lawn mower is yieldingly connected to said tractor.

6. The combination of a tractor, a lawn mower disposed in advance of the tractor, an attachment member carried by the tractor, removable means mounted upon the attachment member, a tubular coupling having one end rotatably supported by the removable means and the forward end disposed in advance of the lawn mower, and means for pivotally connecting the lawn mower with the forward end of the tubular coupling.

7. The combination of a tractor, a lawn mower disposed in advance of the tractor, an attachment member carried by the tractor, removable means mounted upon the attachment member, a tubular coupling having one end rotatably supported by the removable means and the forward end disposed in advance of the lawn mower, means for pivotally connecting the lawn mower with the forward end of the tubular coupling, and a bracket carried by the tractor and arranged to support the tubular coupling substantially at a mid point.

STANLEY WILBUR SHAW.